United States Patent [19]
Schirmacher

[11] Patent Number: 4,874,015
[45] Date of Patent: Oct. 17, 1989

[54] MONITORING SYSTEM

[75] Inventor: Manfred Schirmacher, Bergkamen, Fed. Rep. of Germany

[73] Assignee: Schering Aktiengesellschaft, Bergkamen, Fed. Rep. of Germany

[21] Appl. No.: 294,758

[22] Filed: Jan. 6, 1989

[30] Foreign Application Priority Data

Mar. 3, 1988 [DE] Fed. Rep. of Germany ....... 3806898

[51] Int. Cl.[4] .............................................. F16K 35/00
[52] U.S. Cl. ............................... 137/637.05; 137/554; 137/597; 137/614.06; 285/93
[58] Field of Search ................... 137/554, 597, 614.06, 137/637.05, 798, 799; 285/93

[56] References Cited

U.S. PATENT DOCUMENTS 4,338,812 7/1982 Lindgren .......................... 285/93 X

*Primary Examiner*—Robert G. Nilson
*Attorney, Agent, or Firm*—Scully, Scott, Murphy & Presser

[57] ABSTRACT

A monitoring system for investigating the condition of interconnection between at least two pipelines which are adapted to be coupled to each other through the intermediary of a connecting line, and which are closable at their respective ends through shut-off elements.

6 Claims, 4 Drawing Sheets

MONITORING SYSTEM

BACKGROUND OF THE INVENTION

1. Field of the Invention

The present invention relates to a monitoring system for investigating the condition of interconnection between at least two pipelines which are adapted to be coupled to each other through the intermediary of a connecting line, and which are closable at their respective ends through shut-off elements.

In the utilization of temporary connecting lines between two or more pipelines there is encountered the problem, especially for installations which are operated automatedly, in having to determine whether certain pipeline ends are currently open or coupled to a hose. This problem is encountered in particular when materials or substances which are hazardous to the environment, toxic or combustible, are to be transported in these pipelines, and whose uncontrolled discharge into the surroundings must be prevented in all instances. In this connection, merely by way of example, there may be mentioned the supplying of an industrial installation with different liquids from different tank storages whereby, on the one hand, the interconnection of the pipelines of the tank storage, and on the other hand, that of the industrial installation, is produced through either flexible or rigid connecting lines. Inasmuch as the individual pipelines cooperate with remote-controlled pumps and shut-off elements, it is possible to contemplate numerous instances of mishandlings during the attachment of connecting lines, as well as during the conveyance of the product from the tank storages into the mentioned installation, which to some part, carries along a significant risk to safety.

2. Discussion of the Prior Art

In connection with the foregoing, there must frequently be utilized non-metallic hoses which are capable of being electrically-conductive, in order to prevent the generating of localized electrostatic charges. From this, there can be formed a further source of danger through the operating condition of the connecting lines themselves, which as a result of, for example, external effects can be extensively damaged and thereby adversely influenced in their properties of electrical conductivity.

From the fact that information over the condition interconnection between, on the one hand, the ends of the pipelines of a tank storage, and on the other hand, the ends of an industrial installation are not directly centrally available, there is encountered the further disadvantage that for the control of the quantities of product which are transported from the tank storage, every pump must have a counter associated therewith, which results in a significantly increased cost factor.

SUMMARY OF THE INVENTION

Accordingly, it is an object of the present invention to so develop a monitoring system over the condition of interconnection between at least two pipelines of the above-mentioned type, through which there can be tested the condition of the connecting lines between the above-mentioned pipelines without any difficulty and whereby it is possible to derive safety functions from this monitoring, which relate to the flow of product through the temporary connection.

The foregoing object is inventively attained in that the connecting line is constructed so as to be electrically conductive, a closed electrical circuit being formed across the ends of the pipelines which are to be coupled; the connecting line and a monitoring installation; the shut-off elements for the pipelines being actuatable by a control device which is activatable exclusively by the monitoring installation; and wherein at least the monitoring installation is equipped with means for determining the operating condition of the electrical circuit.

It is of importance to the invention that a closed electrical circuit, which is formed by the connecting line; for example, a flexible connecting hose, the ends of the pipelines which are to be interconnected and a monitoring installation, is employed for testing the operating condition of the juncture or interconnection. This testing is essentially constituted from a test of the electrical conductivity of a section which is bounded by the end of the one pipeline, the connecting line and the end of the other pipeline. From that testing, there can be directly ascertained as to whether a connecting line is at all coupled on; in essence, or possibly as to whether the connecting line has been damaged, to the extent that this damage expresses itself in a reduction in the electrical conductivity. It is further essential to the invention that through the intermediary of, and exclusively from the mentioned monitoring installation, there is activated a control device, by means of which there are opened the shut-off elements of the pipelines which are joined together by the connecting line. This interconnection between the monitoring installation and control device is inventively utilized in that, prior to the opening of the shut-off elements, a safety testing of the interconnection takes place automatically, whereby, any opening is inhibited when malfunctions of the above-mentioned type are ascertained. Hereby, it is moreover essential to be able to provide a continual monitoring of the operating condition of the interconnection, also during the continual product flow, whereby upon suddenly encountered malfunctions, there is again initiated an automatic closing of the shut-off elements which are arranged at the ends of the pipelines.

Pursuant to further features of the invention, the electrically-conductive connecting line is arranged so as to be insulated with respect to the pipelines. Depending upon need, impedances can be provided for the conducting off of static electricity, by means of which the above-mentioned insulated interconnection or juncture of the connecting line is bridged over. At the application of a voltage to the above-mentioned section, there are produced defined potential conditions in the region of the end pieces, which facilitate a singular recognition of any malfunctions or disturbance in the region of each connecting line.

The features of the invention further impart the advantage that the ends of the pipelines which are interconnected with each other, are constantly clearly identified, as a result of which, especially for automated installations, there is obtained the advantage that the condition of the interconnection among the different groups of pipelines is, for example, constantly exactly available in a control room. On the basis of this information, for example, the signal from a counter can basically be also associated with different pumps. From the central availability of information over the condition in the interconnection of the ends of the pipelines there is obtained the further advantage that incorrect connections due to mix-ups are rapidly recognizable, a viewpoint which is of considerable significance, especially for complex installations.

Other features of the invention are directed to different variants thereof, and which are essentially distinguished from each other by the number of the pipelines which are to be interconnected with each other. Thus, for example, the identification of two lines can be undertaken through the polarity of the DC-voltage which is applied to the respective ends of the lines; in effect, the direction of the current which is produced therethrough by the respective electrical circuit. The identification of a certain interconnection is thus undertaken on the basis of the applicable electrical circuit in conjunction with the respective direction of the current. In contrast, in the most generalized instance, in which a first group of lines has a second group of lines positioned opposite thereof, there is inventively undertaken a testing of the individual current or electrical circuits which is staggered in time, whereby the identification of a certain interconnection by means of the respective electrical circuit is carried out in connection with a pulsed or timing signal. Thereby, irrespective of the most simple case of the interconnection of merely two pipelines, two parameters are constantly available for the identification of the respectively coupled pipelines.

BRIEF DESCRIPTION OF THE DRAWINGS

Further advantages and features of the invention can now be readily ascertained from the following generally schematically represented exemplary embodiments, taken in conjunction with the accompanying drawings; in which.

DETAILED DESCRIPTION

Figure 1:
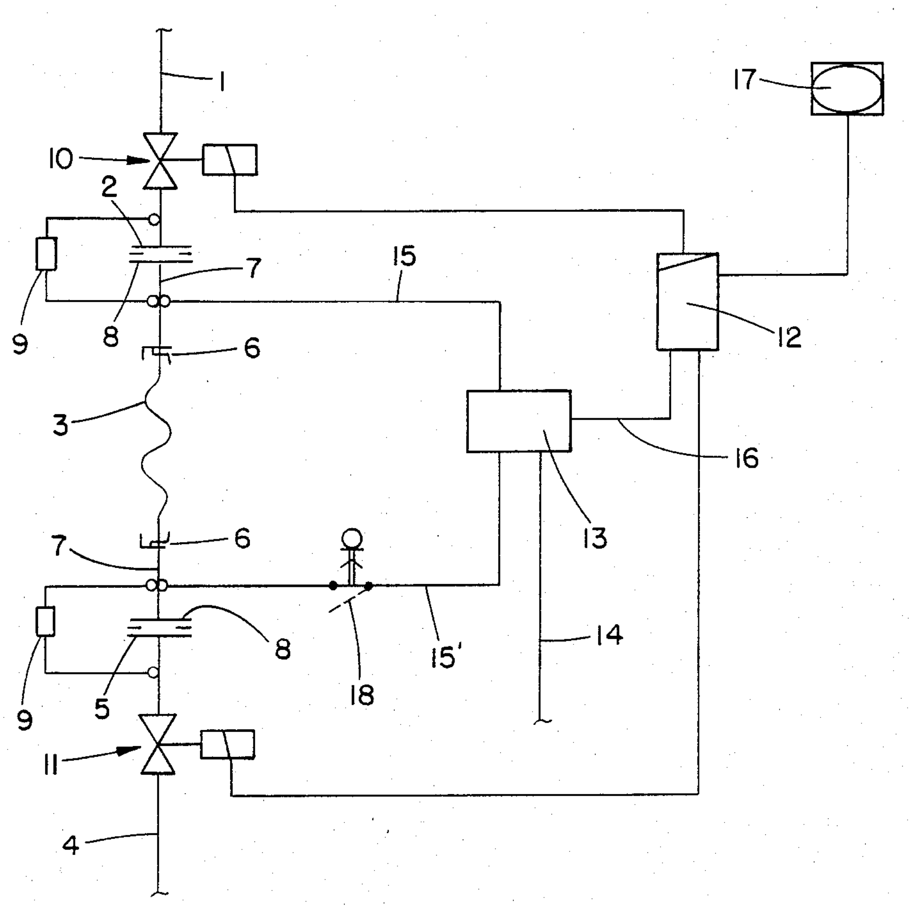
FIG. 1 illustrates a first exemplary embodiment of a monitoring system with merely two pipelines.

In FIG. 1 of the drawings, a pipeline is identified by reference numeral 1, which is equipped with a connecting flange 2 at one end thereof. This pipeline 1 is connected with a pipeline 4 through the intermediary of a connecting line 3, which pipeline 4 at the end thereof facing towards the connecting line 3. The connecting line 3 possesses couplings 6 at both of its ends, which form the connecting elements with end pieces 7, which possess connecting flanges 8 at their respective ends facing towards the pipelines 1, 4.

The flange connections which are formed by the pairings of the connecting flanges 2, 8 and, respectively, 5, 8, are configured so as to be electrically-insulated, whereby impedances 9 are provided in order to avoid localized electrostatic charges, and by means of which there are bridged over the insulating flange connections. The connecting line 3, in conjunction with the end pieces, is for the remainder constructed so as to be electrically-conductive.

Reference numerals 10, 11 identify, for example, electromagnetically switchable shut-off elements, which are arranged at the ends of the pipelines 1, 4, and are actuatable through the intermediary of a control device 12.

Reference numeral 13 identifies a monitoring installation, which is in electrical connection through line elements 15, 15' with the two end pieces which respectively face towards the pipelines 1 and 4. In this manner, there is formed a closed electrical circuit commencing from the monitoring installation 13 across the line element 15', the first end piece 7, the connecting hose 3, the second end piece 7, as well as the line element 15. The monitoring installation 13, which is hereinbelow described in further detail with respect to its functions, serves to impress a definite voltage on this current or electrical circuit whereby, from the impedance or, in effect, a measured current, the can be obtained information with regard to the existence or absence of an appropriate connection between the pipelines 1, 4. The constructive implementation of the monitoring installation 13 can be carried out in any expedient manner so that no further detailed discussion is made thereto hereinbelow.

Reference numeral 14 identifies a line which serves for the voltage supply.

The monitoring installation 13 is in operative connection with the control device 12 through an electrical line 16. An electrical connection is also present between the control unit 12 and a display unit 17 which, from a practical standpoint, for example, can be the monitor of an EDP (electronic data processing) installation.

The monitoring system illustrated in FIG. 1, which serves for the remote-controlled actuation of the shut-off elements 10, 11, and thereby for the initiation or termination of a product flow between the pipelines 1, 4, while maintaining certain safety regulation, can be arranged spatially branched out. Thus, for example, the control device, the monitoring installation, and as well the display unit, can be arranged in a control room, and thereby at a considerable distance from the pipelines 1, 4. It is essential that, commencing from this control room, a product flow can be initiated through the intermediary of the monitoring installation 13 whereby, by means of the display unit 17, there is indicated the operating condition of the interconnection between the pipelines 1, 4 in addition to any eventual malfunctions. Hereinbelow, there is set forth a brief explanation with respect to the mode of operation of this inventive monitoring system.

Upon the introduction of a control command into the monitoring installation 13 which is directed towards the initiation of a product flow, prior to the transmission of a corresponding signal to the control device 12, the above-mentioned electrical circuit is tested whereby, on the basis of the overall impedance or resistance thereof, it is immediately recognizable as to whether an interconnection is at all present between the ends of the pipelines 1, 4. This impedance or current measurement takes place during a defined time interval, after the passage of which, in the event that the information can be derived from the measurement that the above-mentioned interconnection is existent, a signal is transmitted to the control device 12 through the line 16, through which the two shut-off elements 11, 12 are caused to be switched over into the opened condition. During the thusly initiated product flow, the monitoring system remains activated; meaning, it is in particular continually monitored as to whether the initially determined interconnection between the pipelines 1, 4 is maintained; or for example, because of a result of any damages there is influenced the electrical conductivity of the connecting line 3, through which there could be possibly encountered the danger of localized electrostatic charges. In all of these instances, through the line 16 and the control device 12 there is effectuated immediate closing of the shut-off elements 10, 11, and through the display unit 17 there is signaled the type of the malfunction.

Reference numeral 18 designates an actuating element; for example, an emergency shutoff switch, through which the intrinsically safe, hereinbefore-designated electrical circuit can be interrupted in case of need, whereby this actuating element can be located; for instance, in the proximity of the pipeline.

One already ascertains from the above-mentioned elucidations that an opening of the shutoff elements 10, 11 is then precluded, notwithstanding a control command which is transmitted to the monitoring installation 13 when, in actuality, no connection is in existence between the pipelines 1, 4. In addition to the foregoing, any suddenly occurring damage to the connecting line 3 will trigger an automatic closing of the shut-off elements 10, 11; to the extent that this damage is confronted with a sufficient degree of change in the electrical impedance or resistance.

Figure 2:
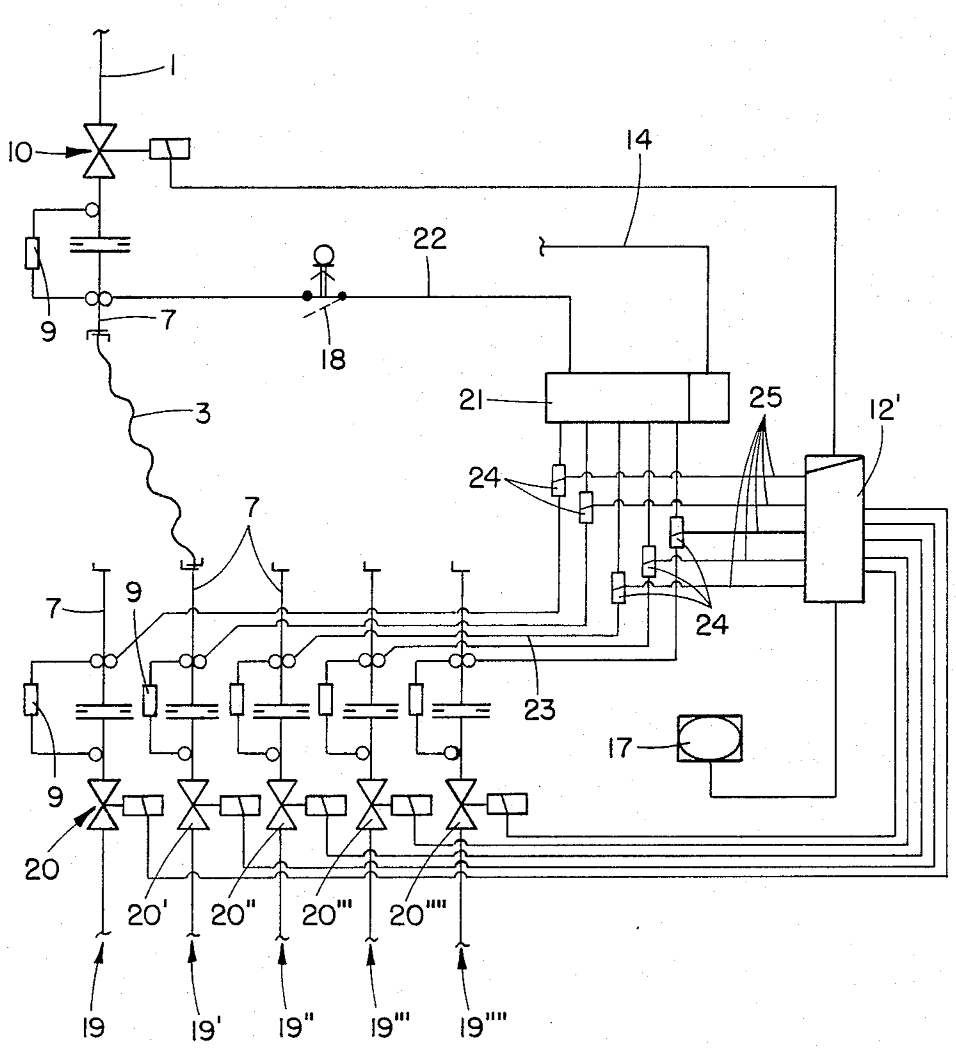
FIG. 2 illustrates a second embodiment of a monitoring system in which five pipelines are arranged opposite a single pipeline.
Figure 3:
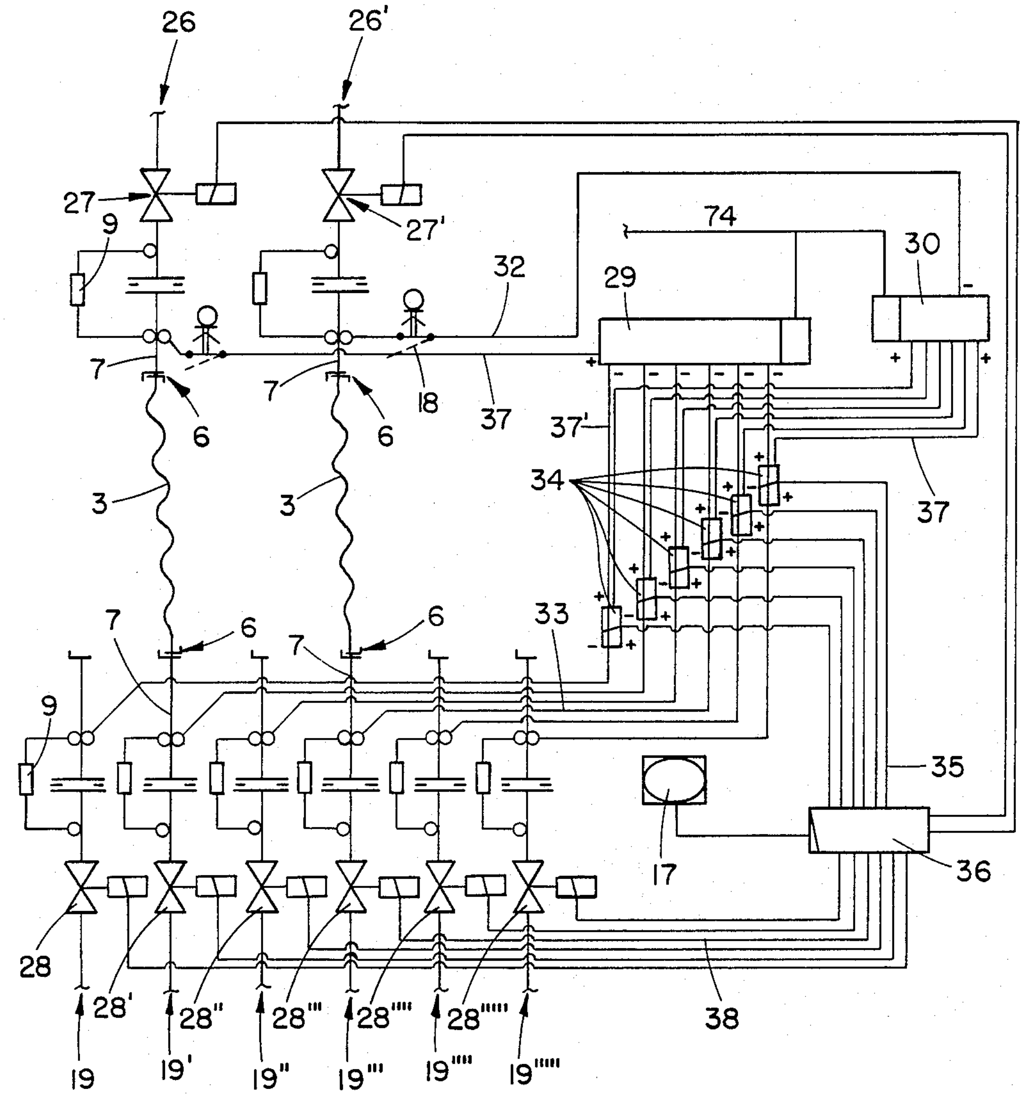
FIG. 3 illustrates a third embodiment of a monitoring system in which six pipelines are arranged opposite two pipelines.
Figure 4:
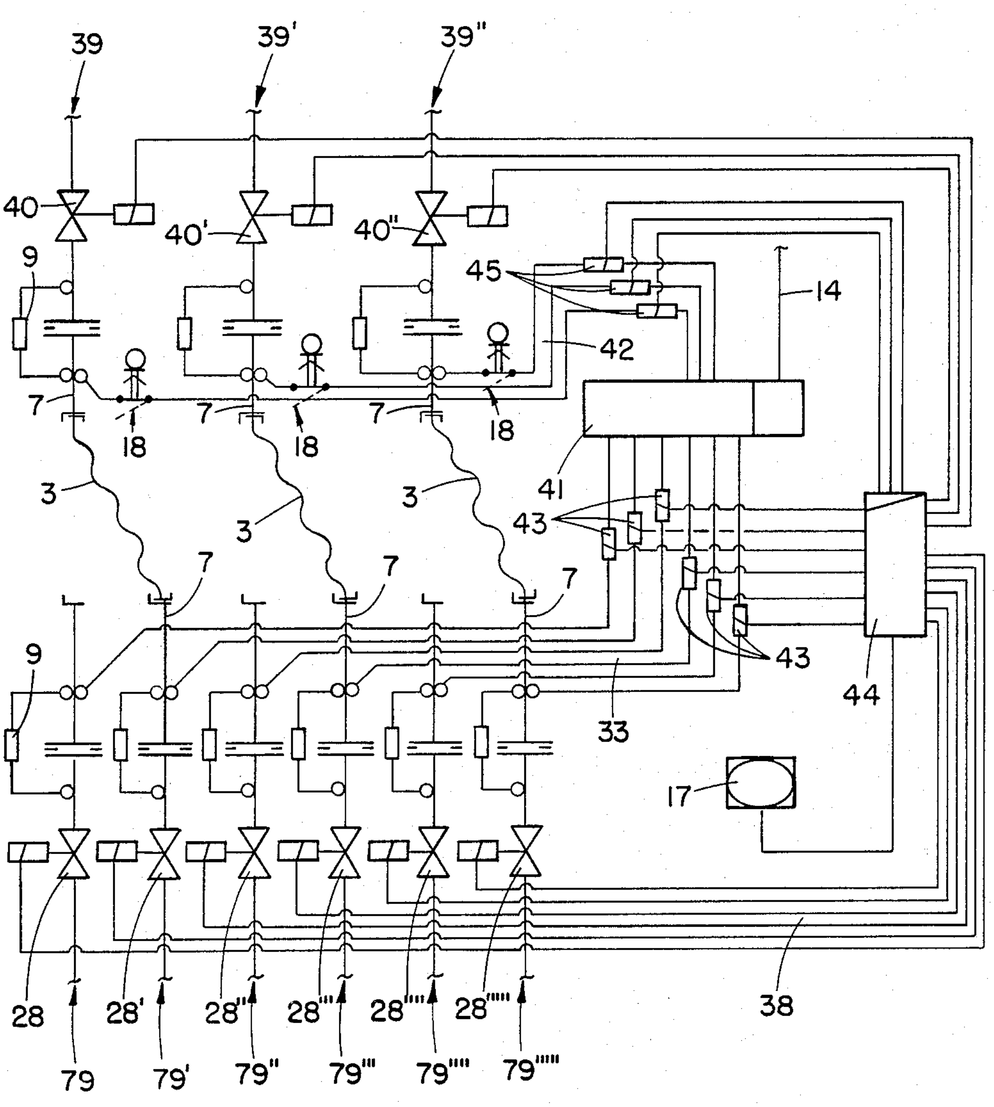
FIG. 4 illustrates a representation of the most general case for a monitoring system in which two groupings of pipeline systems are arranged opposite each other.

In the further exemplary embodiments which are represented in FIGS. 2 through 4 of the drawings, which are directed to different modifications and further developments of the principle pursuant to FIG. 1, comparable operating elements are identified by the same reference numerals, so as to obviate the need for any repeated description thereof.

Pursuant to FIG. 2, a pipeline 1 can be selectively connected with one of a group of pipelines 19, 19′, 19″, 19‴ and 19⁗ through the interposition of a connecting line 3. Each pipeline 19 through 19⁗ of this group has, for example, electromagnetically-actuatable shut-off element 20, 20′, 20″, 20‴ and 20⁗ associated therewith, which is in operative connection through a respective electrical line with a control device 12′.

Reference numeral 21 relates to a monitoring installation which is in electrical connection, on the one hand, through an electrical line element 22 with the end piece 7 of the pipeline 1, and on the other hand, through a group of electrical line elements 23 with the end pieces 7 of the pipelines 19 through 19⁗. A sensor 24 is located in the course of each and every line element of the group 23, whereby the sensors 24, in turn, are in connection with the control device 12′ through individual electrical lines 25. These sensors can be constructed in practically any suitable manner; however, in every instance it relates to operational elements through which, in dependence upon the electrical current flowing in the respective electrical line of the group 23, a corresponding signal is transmitted to the control device 12′. For example, the sensors can be constructed as relay switches or transistor switches.

It can be ascertained that in the constellation of pipelines which are illustrated in FIG. 2, in which a pipeline 1 can be selectively connected with a pipeline which is chosen from a group of pipelines, that a closed electrical circuit in conformance with the exemplary embodiment of FIG. 1, can only be formed across the interconnected pipelines, in this case, the pipelines 1 and 19′.

The initiation of a product flow through the opening of valves, as in the exemplary embodiment of FIG. 1, is implemented through the monitoring installation 21, through which there is initially tested the coupled condition of the connecting line in the above-discussed manner. Only subsequently thereof are the valves opened by means of the control device 12′, in this instance, the valves 10 and 20′. A monitoring sequence is maintained as long as the product continues to flow, so that upon any damage being encountered by the connecting line, which results in corresponding changes in the electrical conductivity thereof, there is triggered an automatic closing of the shut-off elements.

Through information over the switching condition of the sensors 24 which, for example, can be integrated as structural components into the monitoring installation 21, there is obtained a precise picture over the condition of juncture or interconnection between the pipelines 1 and 19 through 19⁗. In conjunction with special counting installations, there is thus also constantly available precise information with respect to the association of product quantities which are transmitted between suitable pairings of pipelines. In particular, because of the known condition of juncture, there is afforded the capability of associating the signal of one counter with different pipelines.

In the exemplary embodiment pursuant to FIG. 3, the capability is present of joining, on the one hand, two pipelines 26, 26′ in a suitable manner with two pipelines from a group of pipelines 19 through 19⁗′ by means of connecting lines 3; for example, such as flexible connecting hoses. The juncture or interconnection is effectuated in the same manner as in the above-mentioned exemplary embodiments; for instance, such as through couplings 6 and end pieces 7, the last-mentioned of which are connected through electrically-insulatedly formed flange connections to the applicable pipelines 26, 26′; and on the other hand, to pipelines 19′, 19‴. The mentioned pipelines 26, 26′ are closed off through the intermediary of, for instance, electromagnetically-actuatable shut-off elements 27, 27′, whereas each pipeline of the group of pipelines 19 through 19⁗′ similarly has an electromagnetically-switchable shut-off element 28 through 28⁗′ associated therewith.

In this constellation of pipelines there is also encountered the basic problem of rendering information available with respect to a condition of interconnection between the pipelines to a central control station, and to additionally monitor the condition of the connecting lines during the flow of a product.

Reference numeral 29, 30 identify operational elements of a monitoring installation, which are in connection through an electrical line 14 with a common power supply terminal.

The operational elements 29, 30 are each in electrical connection through line elements 31, 32 with the end pieces 7 of the pipelines 26, 26′.

Reference numeral 33 designates a group of individual electrical lines which are each respectively associated with an end piece 7 of the group of pipelines 19 through 19⁗′, in the course of each which there is arranged a sensor 34. A first line 35 leads from each sensor 34 to a control device 36, as well as second and third lines 37, 37′ to respectively one of the operational elements 29, 30. A group of individual lines designated with reference numeral 38 leads from the control device 36 to the individual valves 28 through 28⁗′.

The division of the monitoring installation into the operational elements 29, 30 serves the purpose of applying voltages of different polarity to the end pieces 7 of the pipelines 26, 26′. As a consequence thereof, the sensors 34 are structural components through which there is determined, applicable relative to an electrical line of the group 33, as to whether an electrical current flows therein and which direction is evidenced by this current. From this information, there is conducted a corresponding signal through the group of lines which is formed by the lines 35, to the control installation 36, so that by means of the latter there are opened the shut-off elements 27, 27', as well as in the herein illustrated exemplary embodiment, the shut-off elements 28' and 28''', in the event that the testing of the current circuits with regard to their electrical conductivities, these circuits essentially being formed by the connecting lines 3 as well as the operational elements 29, 30 o the monitoring installation, provides the testimony that, on the one hand, there is existent an interconnection of the pipelines 26, 26', and on the other hand, of the pipelines 19', and 19'''.

Employable as sensors 34 can be any type of electrical components through which there can be fulfilled the above-mentioned functions. Thus, for example, in this instance there can again be employed relay switches or also corresponding semiconductor switching circuits.

It is ascertainable that even in the exemplary embodiment pursuant to FIG. 3, there is available from the switching position of the sensors 34 a precise picture over the condition of the juncture or interconnection between, on the one hand, the pipelines 26, 26', and on the other hand, 19 through 19''''', and that during a product flow a continual monitoring is possible across these junctures.

The embodiment which is illustrated in FIG. 4 is merely distinguished from that pursuant to FIG. 3 in that in this instance three pipelines 39, 39' and 39'' are to be interconnected with three pipelines from a group of pipelines 19 through 19''''' through the intermediary of connecting lines 3. Identified by reference numerals 40, 40' and 40'' are the shut-off elements which are respectively associated with pipelines 39 through 39''. The principle of operation shown herein, however, is not limited to three pipelines 39 through 39'', but within a broad framework can also be employed for the combination, on the one hand, of a first group of "n" pipelines with selected pipelines from a second group of "m" pipelines.

Reference numeral 41 again designates a monitoring installation, which stands in electrical connection through a group 42 of electrical lines with the end pieces 7 of the pipelines 39, 39' and 39''. Reference numeral 43 again identifies sensors of which one is arranged in respectively each line of the group 33, and of which each is in connection with a control device 44. These sensors 43 serve merely for the determination of an electrical current in the applicable line and for the transmission of a signal indicating this current to the control device 44.

Reference numeral 45 identifies further sensors which are each respectively associated with electrical line elements connecting the monitoring installation 41 with the end pieces 7 of the pipelines 39, 39' and 39''. The monitoring system pursuant to FIG. 4 is designed in conformance with the multiplicity of the pipelines 39, 39' and 39'', such that the testing of the interconnections is effected in a pulse-like manner; in essence, through the monitoring installation 41 the current is transmitted the connecting lines 3 staggered in time. As a consequence, the sensors 45 serve for the determination that in the applicable line there is presently transmitted a "testing current", so that by means of the applicable sensor 45 there is transmitted a corresponding pulse signal to the control device 44. This signifies that the identifying of one of the pipelines in the respective group of pipelines 39 through 39'' is carried out on the basis of this pulse signal, so that from the connection of this pulse signal with the signal which is transmitted through the sensors 43 there is obtainable, on the one hand, a picture of the condition of juncture of the pipelines 39 through 39'', and on the other hand, 19 through 19'''''. The practical realization of this electrical concept can be implemented by means of components which are known in the technology, so that no further detailed discussion is needed with regard thereto. The mode of operation in the testing of the juncture or interconnection prior to the initiation of a product flow, as well as the monitoring during the product flow, takes place in the same manner as in the previously described embodiments.

What is claimed is:

1. In a monitoring system for monitoring the condition of interconnection between at least two pipelines; a connecting line for coupling said pipelines to each other; and shut-off elements for closing the ends of each of said pipelines; the improvement in that said connecting line is electrically-conductive so as to form a closed electrical circuit across the ends of the pipeline which are to be interconnected, said connecting line and a monitoring installation; control means for actuating the shut-off elements for said pipelines being exclusively activatable by the monitoring installation; and at least the monitoring installation including means for determining the operating condition of said electrical circuit.

2. A monitoring system as claimed in claim 1, wherein metallic end pieces are insulatedly mounted at the ends of said pipelines, said end pieces comprising connecting locations for the electrical circuit, and said connecting line being attached to said end pieces.

3. A monitoring system as claimed in claim 1, wherein either said control means and said monitoring installation includes means for identifying pipelines in the interconnection of a first group of pipelines with a second group of pipelines by a plurality of said connecting lines.

4. A monitoring system as claimed in claim 3, wherein said means for identifying the interconnected pipelines of said two groups comprise sensors for determining the operating condition of the electrical circuit into which there is incorporated the ends of the respective pipelines; and said control means includes means for the evaluation of signals which are transmitted from said sensors.

5. A monitoring system as claimed in claim 4, wherein said monitoring installation comprises means for effectuating the timewise staggered testing of individual of said electrical circuits.

6. A monitoring system as claimed in claim 1, wherein upon the interconnection of a first group consisting of two pipelines with a second group of pipelines, at least one of said monitoring installation and said control means comprise means for identifying the interconnected pipelines, said identifying means include sensors for determining the operating condition of the electrical circuit having the ends of the respective pipelines of said second group incorporated therein, said sensors facilitating determination of at least two electrical parameters of the applicable current circuit and to thereby render electrical signals transmissible to said monitoring installation; and means in said control means for the evaluation of signals transmitted from said sensors.

* * * * *